United States Patent
Ogino et al.

(10) Patent No.: US 10,623,642 B2
(45) Date of Patent: Apr. 14, 2020

(54) IMAGE CAPTURING APPARATUS AND CONTROL METHOD THEREOF WITH CHANGE, IN EXPOSURE PERIOD FOR GENERATING FRAME, OF CONVERSION EFFICIENCY

(71) Applicant: CANON KABUSHIKI KAISHA, Tokyo (JP)

(72) Inventors: Masaya Ogino, Kawasaki (JP); Satoshi Koizumi, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 19 days.

(21) Appl. No.: 15/993,775

(22) Filed: May 31, 2018

(65) Prior Publication Data
US 2018/0359400 A1 Dec. 13, 2018

(30) Foreign Application Priority Data
Jun. 13, 2017 (JP) ................. 2017-116090

(51) Int. Cl.
| | | |
|---|---|---|
| H04N 5/232 | (2006.01) | |
| H04N 5/262 | (2006.01) | |
| H04N 5/378 | (2011.01) | |
| H04N 5/355 | (2011.01) | |
| H04N 5/3745 | (2011.01) | |

(52) U.S. Cl.
CPC ....... *H04N 5/2327* (2013.01); *H04N 5/23267* (2013.01); *H04N 5/2621* (2013.01); *H04N 5/3559* (2013.01); *H04N 5/378* (2013.01); *H04N 5/37452* (2013.01)

(58) Field of Classification Search
CPC ............ H04N 5/2327; H04N 5/23267; H04N 5/2621; H04N 5/3559; H04N 5/37452; H04N 5/378
See application file for complete search history.

(56) References Cited

U.S. PATENT DOCUMENTS 6,486,460 B1 * 11/2002 Murakami ........ H01L 27/14654
250/208.1
2015/0156387 A1 6/2015 Miyakoshi

FOREIGN PATENT DOCUMENTS

JP 2015-109503 A 6/2015

* cited by examiner

*Primary Examiner* — Nicholas G Giles
(74) *Attorney, Agent, or Firm* — Venable LLP

(57) ABSTRACT

An image capturing apparatus for capturing a moving image is provided. The apparatus includes a photoelectric conversion portion configured to generate charges in accordance with incident light in an exposure period, a generation unit configured to generate a pixel signal of each frame based on charges generated in the photoelectric conversion portion, and a control unit configured to change, in an exposure period for generating one frame, a conversion efficiency of converting the incident light to the photoelectric conversion portion into the pixel signal.

11 Claims, 9 Drawing Sheets

CASE WITH SHORT EXPOSURE TIME

CASE WITH LONG EXPOSURE TIME

FOUR DIVIDED EXPOSURE OPERATIONS

IMAGE OF BALL OBTAINED
BY FOUR DIVIDED EXPOSURE OPERATIONS

IMAGE CAPTURING APPARATUS AND CONTROL METHOD THEREOF WITH CHANGE, IN EXPOSURE PERIOD FOR GENERATING FRAME, OF CONVERSION EFFICIENCY

BACKGROUND OF THE INVENTION

Field of the Invention

The present invention relates to an image capturing apparatus and a control method thereof.

Description of the Related Art

In recent years, a camcorder that uses a solid-state image sensor is used for shooting moving images such as movies, commercial advertisements, and the like which were conventionally shot on film. In these applications, it is important not only to simply record an image which is readable but also to consider the quality of the image. In the case of still image shooting, due to the increased sensitivity of image sensors, it has become easier to record a moving object sharply by using a high speed shutter. On the other hand, in the case of moving image shooting, using the high speed shutter can cause the connection between frames to seem unnatural. In many cases, an image that is blurred to a certain extent by using a low speed shutter can seem more natural when the image is played back.

A signal output of an image sensor can be represented as output=amount of incident light× gain×exposure time    (1)

Since the amount of incident light is determined by the aperture of an optical system or an ND filter and cannot be changed by driving the sensor, it can be set as a constant 1. In this case, the signal output of the image sensor can be represented as output=gain×exposure time    (2)

FIGS. 8A and 8B show the relationship between the time and the gain in a case with a short exposure time (a case using the high speed shutter) and that in a case with a long exposure time (a case using the low speed shutter), respectively. FIG. 8A shows the case in which the exposure time is short, and FIG. 8B shows the case in which the exposure time is long, and each area represents the magnitude of the signal output of an object. In FIG. 8B, the output of a still object in a screen is made equal to that shown in FIG. 8A by reducing the gain in accordance with the prolonged exposure time.

SUMMARY OF THE INVENTION

There is disclosed an example in which the image quality of a moving image is improved by blurring an object to make the connection between frames seem natural. Japanese Patent Laid-Open No. 2015-109503 discloses an example in which a moving image is made to seem natural by obtaining, even for a bright object which tends to seem unnatural because the operation of a high-speed shutter can cause jerkiness between frames, a blurred image by performing a transfer operation from a photodiode of a solid-state image sensor to a memory unit a plurality of times. The relationship between the time and the gain in this case is as shown in FIG. 9A.

Although it has been described that the connection between frames seems more natural when the object is blurred, depending on the shape of the blur in the frame, it may give an unnatural impression when one frame of a moving image is paused and viewed. For example, FIG. 9A shows the relationship between the time and the gain in an exposure time when four divided exposure operations are performed in the method disclosed in Japanese Patent Laid-Open No. 2015-109503. If a moving ball is shot by such an exposure method, it will seem as if there were four overlapping balls of the same density when the image is paused (FIG. 9B).

In this case, it cannot be said that the frame has good image quality even if the connection between the frames has been comparatively improved. That is, to improve image quality, not only the connection between the frames but also the shape of the blur in the frame needs to have a more natural-looking shape. An aspect of the present invention provides a technique to make the shape of a blur in a frame into a more natural-looking shape.

According to some embodiments, an image capturing apparatus for capturing a moving image, comprising: a photoelectric conversion portion configured to generate charges in accordance with incident light in an exposure period; a generation unit configured to generate a pixel signal of each frame based on charges generated in the photoelectric conversion portion; and a control unit configured to change, in an exposure period for generating one frame, a conversion efficiency of converting the incident light to the photoelectric conversion portion into the pixel signal is provided.

Further features of the present invention will become apparent from the following description of exemplary embodiments (with reference to the attached drawings).

DESCRIPTION OF THE EMBODIMENTS

Figure 1:
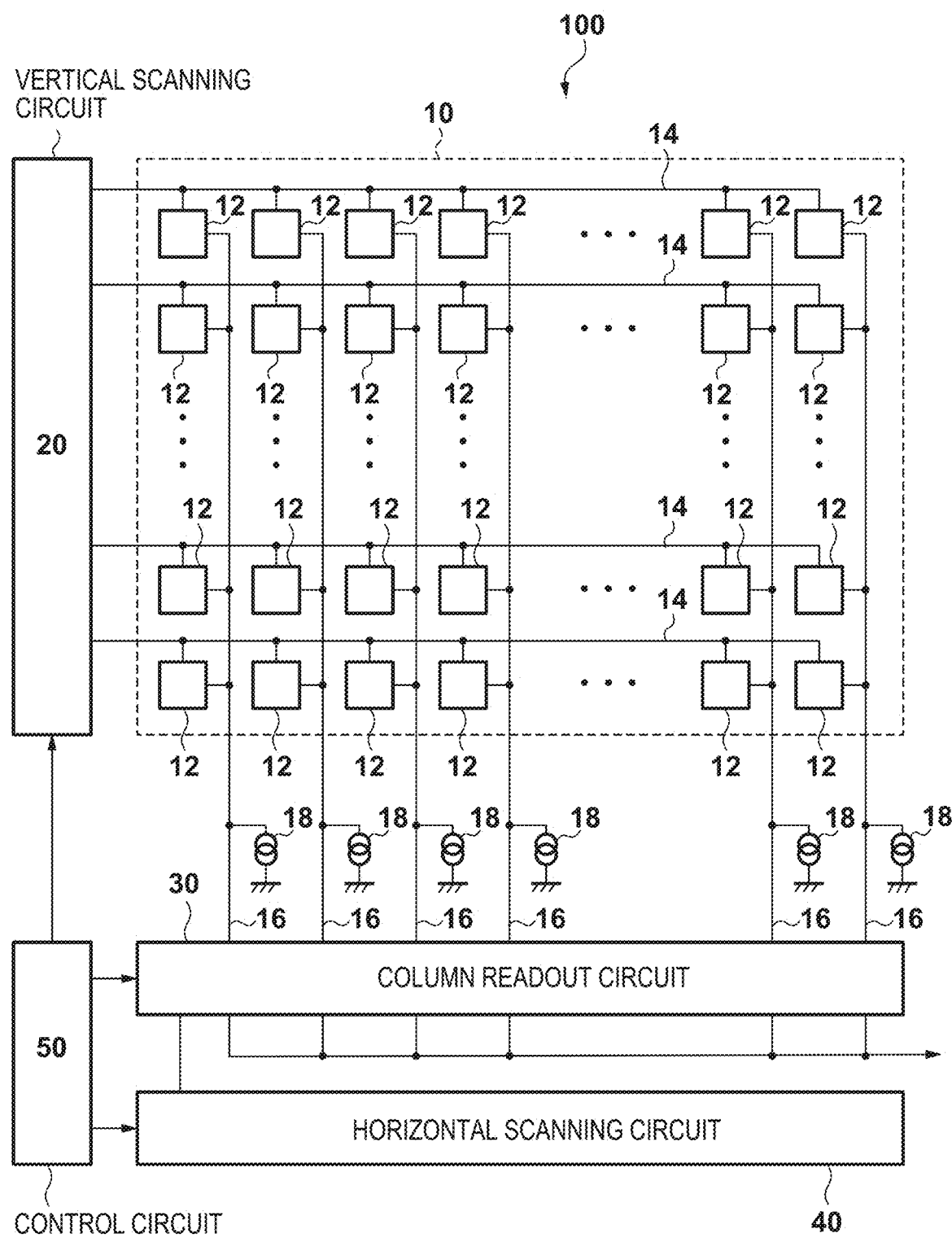
FIG. 1 is a block diagram for explaining the arrangement of an image capturing apparatus according to the first embodiment.

Embodiments of the present invention will be described below with reference to the accompanying drawings. The same reference numerals will denote the same elements throughout the various embodiments, and a repetitive description thereof will be omitted. The embodiments can be changed and combined as needed.

First Embodiment

Figure 2:
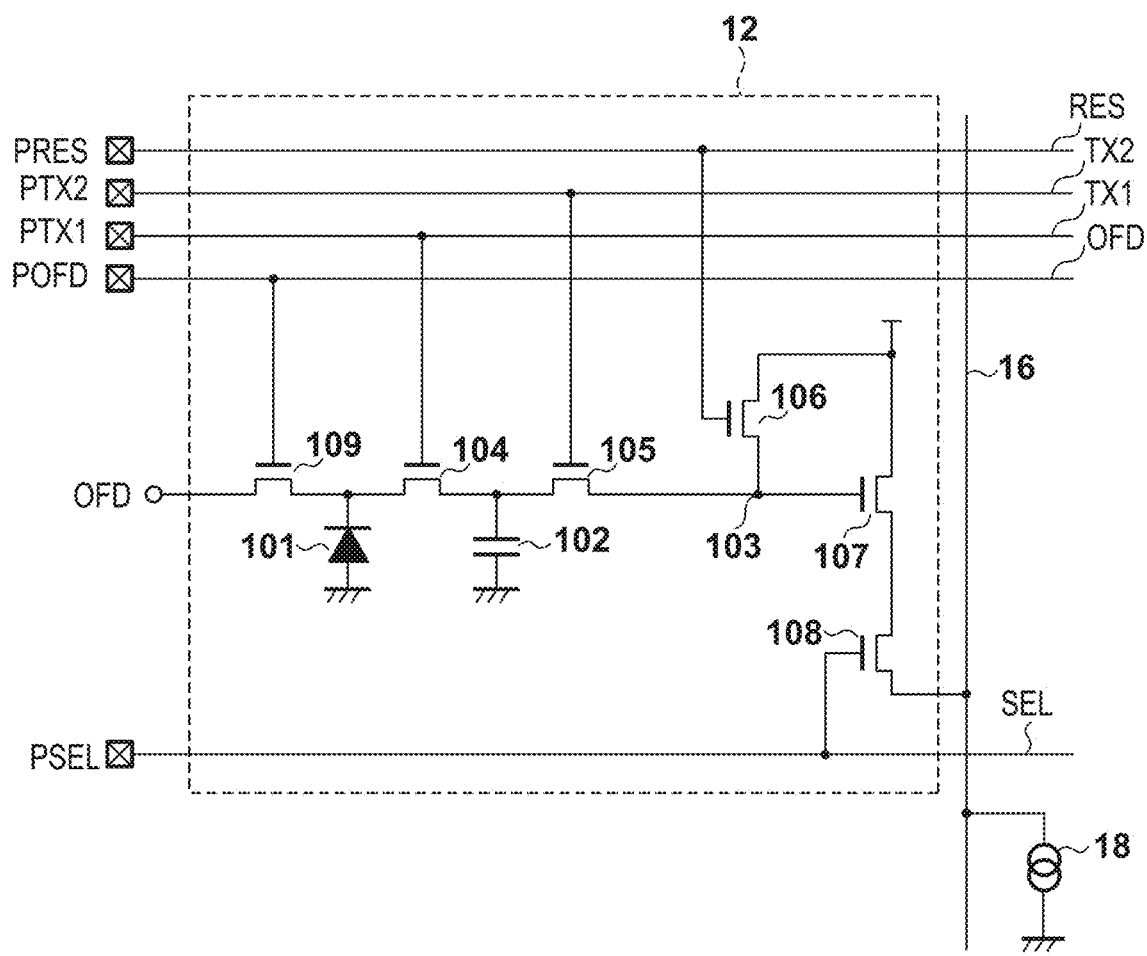
FIG. 2 is a diagram for explaining the arrangement of a pixel according to the first embodiment.

An example of the arrangement of an image capturing apparatus 100 according to the first embodiment of the present invention will be described below with reference to FIGS. 1 and 2. FIG. 1 is a block diagram showing the arrangement of the image capturing apparatus 100 according to this embodiment. FIG. 2 is a diagram showing the circuit arrangement of a pixel 12 of the image capturing apparatus 100 according to this embodiment.

As shown in FIG. 1, the image capturing apparatus 100 includes a pixel array 10, a vertical scanning circuit 20, a column readout circuit 30, a horizontal scanning circuit 40, and a control circuit 50. The image capturing apparatus 100 is used for capturing a moving image.

The plurality of pixels 12 are arranged in a matrix along a row direction and a column direction in the pixel array 10. For the sake of simplicity of the drawing, FIG. 1 shows only some of the pixels 12 of the pixel array 10. The number of pixels 12 to be arranged in the row direction and the column direction is not particularly limited. In this specification, the row direction indicates a lateral direction (horizontal direction) in the drawing, and the column direction indicates a longitudinal direction (vertical direction) in the drawing.

Each pixel 12 includes, as shown in FIG. 2, a photodiode 101, a transfer transistor 104, a transfer transistor 105, a reset transistor 106, an amplification transistor 107, a selection transistor 108, and an overflow drain transistor 109.

The anode of the photodiode (to be noted to as a "PD" hereinafter) 101 is connected to a ground voltage line, and the cathode is connected to the source of the transfer transistor 104 and the source of the overflow drain (to be noted to as an "OFD" hereinafter) transistor 109. The drain of the transfer transistor 104 is connected to the source of the transfer transistor 105. A connection node between the drain of the transfer transistor 104 and the source of the transfer transistor 105 forms a charge accumulation unit (to be noted as an "MEM" hereinafter) 102. The MEM 102 is represented as a capacitive element in FIG. 2. The drain of the transfer transistor 105 is connected to the source of the reset transistor 106 and the gate of the amplification transistor 107. A connection note between the drain of the transfer transistor 105, the source of the reset transistor 106, and the gate of the amplification transistor 107 forms a floating diffusion unit (to be noted as an "FD unit" hereinafter) 103. The drain of the reset transistor 106 and the drain of the amplification transistor 107 are connected to a power source voltage line (a voltage Vdd). The source of the amplification transistor 107 is connected to the drain of the selection transistor 108. The drain of the OFD transistor 109 is connected to a charge discharge unit (that is, OFD). The charge discharge unit is, for example, a voltage source that supplies the voltage Vdd. The potential of the PD 101 is reset to Vdd when the OFD transistor 109 is turned on. The potential of the FD unit 103 and the potential of the MEM 102 are reset to Vdd when the reset transistor 106 is turned on.

The source and the drain of a transistor can change in accordance with the conductivity type of the transistor or the function of interest, and some or all of the above-described sources and drains may be called by their reversed names. In this specification, for a transistor positioned in a transfer path of signal charges generated by the PD, a source denotes a node to which signal charges are input and a drain denotes a node from which signal charges are output.

The PD 101 is a photoelectric conversion portion that generates signal charges in accordance with incident light in an exposure period. The MEM 102 is a holding unit for holding charges. The transfer transistor 104 is a transistor for transferring the charges generated and held in the PD 101 to the MEM 102. The transfer transistor 105 is a transistor for transferring charges accumulated in the MEM 102 to the FD unit 103. The reset transistor 106 is a transistor used when resetting the charges of the FD unit 103. The amplification transistor 107 is a transistor for amplifying and outputting a signal in accordance with the charge amount of the FD unit 103. The selection transistor 108 is a transistor for selecting the pixel 12 from which a signal is to be read out. The OFD transistor 109 is a transistor for discharging the accumulated charges in the PD 101 to the OFD.

In each row of the pixel array 10, there is arranged a driving signal line 14 extending in the row direction. Each driving signal line 14 forms a common signal line for the corresponding pixels 12 aligned in the row direction. Each driving signal line 14 is connected to the vertical scanning circuit 20. When a signal from each pixel 12 is to be read out, a predetermined driving signal for driving a pixel readout unit of the pixel 12 is output to the corresponding driving signal line 14 from the vertical scanning circuit 20 at a predetermined timing. The vertical scanning circuit 20 is a control unit to read out pixel signals from the pixels 12 by controlling the pixel readout units of the respective pixels 12. In FIG. 1, although the driving signal line 14 for each row is indicated by a single line, each row typically includes a plurality of driving signal lines.

In the case of the pixel 12 shown in FIG. 2, the driving signal line 14 includes a reset signal line RES, a transfer gate signal line TX1, a transfer gate signal line TX2, a selection signal line SEL, and an OFD control signal line OFD. The reset signal line RES is connected to the gate of the reset transistor 106 and is a signal line for controlling the operation of the reset transistor 106 by a reset control signal PRES output from the vertical scanning circuit 20. The transfer gate signal line TX1 is connected to the gate of the transfer transistor 104 and is a signal line for controlling the operation of the transfer transistor 104 by a transfer gate control signal PTX1 output from the vertical scanning circuit 20. The transfer gate signal line TX2 is connected to the gate of the transfer transistor 105 and is a signal line for controlling the operation of the transfer transistor 105 by a transfer gate signal line TX2 output from the vertical scanning circuit 20. The selection signal line SEL is connected to the gate of the selection transistor 108 and is a signal line for controlling the operation of the selection transistor 108 by a selection control signal PSEL output from the vertical scanning circuit 20. The OFD control signal line OFD is connected to the gate of the OFD transistor 109 and is a signal line for controlling the operation of the OFD transistor 109 by an OFD control signal POFD output from the vertical scanning circuit 20.

In each column of the pixel array 10, there is arranged a vertical signal line 16 extending in the column direction. Each vertical signal line 16 is connected to the sources of the selection transistors 108 of the respective pixels 12 aligned in the column direction, and forms a common signal line for these pixels 12. One end of each vertical signal line 16 is connected to the column readout circuit 30 and a corresponding current source 18.

The column readout circuit 30 is a circuit for reading out, for each column, pixel signals output from the pixel array 10. The column readout circuit 30 is a generation unit that generates a pixel signal for each frame based on the charges generated in each PD 101. The horizontal scanning circuit 40 is connected to the column readout circuit 30. Based on a control signal from the horizontal scanning circuit 40, the column readout circuit 30 sequentially outputs, to an output circuit (not shown), the pixel signals read out from the respective pixels 12 for each column.

The control circuit 50 controls the overall operation of the image capturing apparatus 100 by controlling the operations of the vertical scanning circuit 20, the column readout circuit 30, and the horizontal scanning circuit 40. The control circuit 50 may be formed from a combination of a general purpose circuit such as a microprocessor (for example, a CPU) and a memory or may be formed by a dedicated circuit such as an ASIC (Application-Specific Integrated Circuit).

Figure 3A:
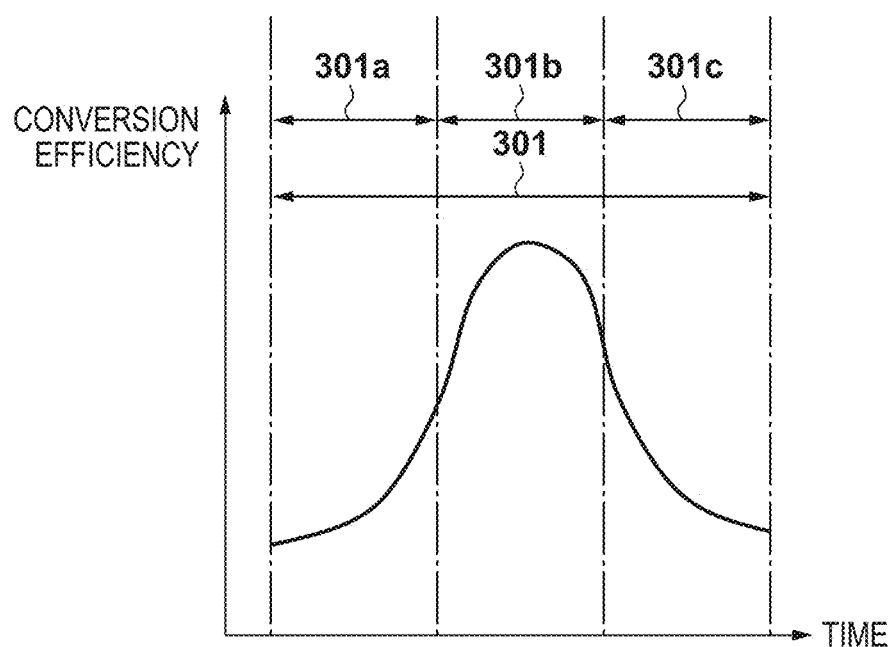
FIGS. 3A and 3B are views for explaining a change in conversion efficiency according to the first embodiment.

An overview of the operation of the image capturing apparatus 100 will be described next with reference to FIGS. 3A and 3B. FIG. 3A is a graph showing the change in conversion efficiency of incident light in an exposure period for generating one frame. The conversion efficiency of incident light is the conversion efficiency of converting light that entered the PD 101 into a pixel signal and is, more specifically, the value of a signal read out from the column readout circuit 30 when light having a unit light amount has entered the PD 101. The higher the conversion efficiency, the larger the pixel value of a frame is. The control circuit 50 changes the conversion efficiency during an exposure period 301 for generating one frame.

An example of the change in the conversion efficiency will be described below. The exposure period 301 is divided equally into three periods of an initial period 301a, a middle period 301b, and a final period 301c. The control circuit 50 changes the conversion efficiency so that the conversion efficiency in the middle period 301b will be higher (that is, so as to have an upwardly convex shape) than the conversion efficiency in the initial period 301a and the conversion efficiency in the final period 301c. The conversion efficiency in the initial period 301a may be, for example, an average value of conversion efficiencies in the initial period 301a or may be another representative value. The same applies also to the conversion efficiency of the middle period 301b and the conversion efficiency of the final period 301c.

Figure 3B:
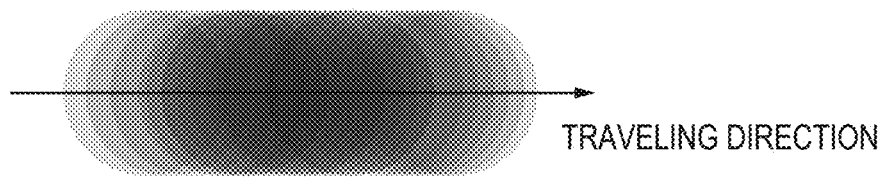

A frame as that shown in FIG. 3B is obtained when the control circuit 50 changes the conversion efficiency in this manner. FIG. 3B shows a frame of a moving image that has captured a ball which is moving from left to right. The image of the ball has been blurred by prolonging the exposure period 301 to some extent, and this makes the connection between the frames seem natural. In addition, since the central portion of the ball in the traveling direction is dense while the edge portion of the ball in the traveling direction is light, it creates a state in which the object in the single frame has a moderate blur width while having a weight near the center, and this reduces the unnaturalness on a frame basis.

Figure 4:
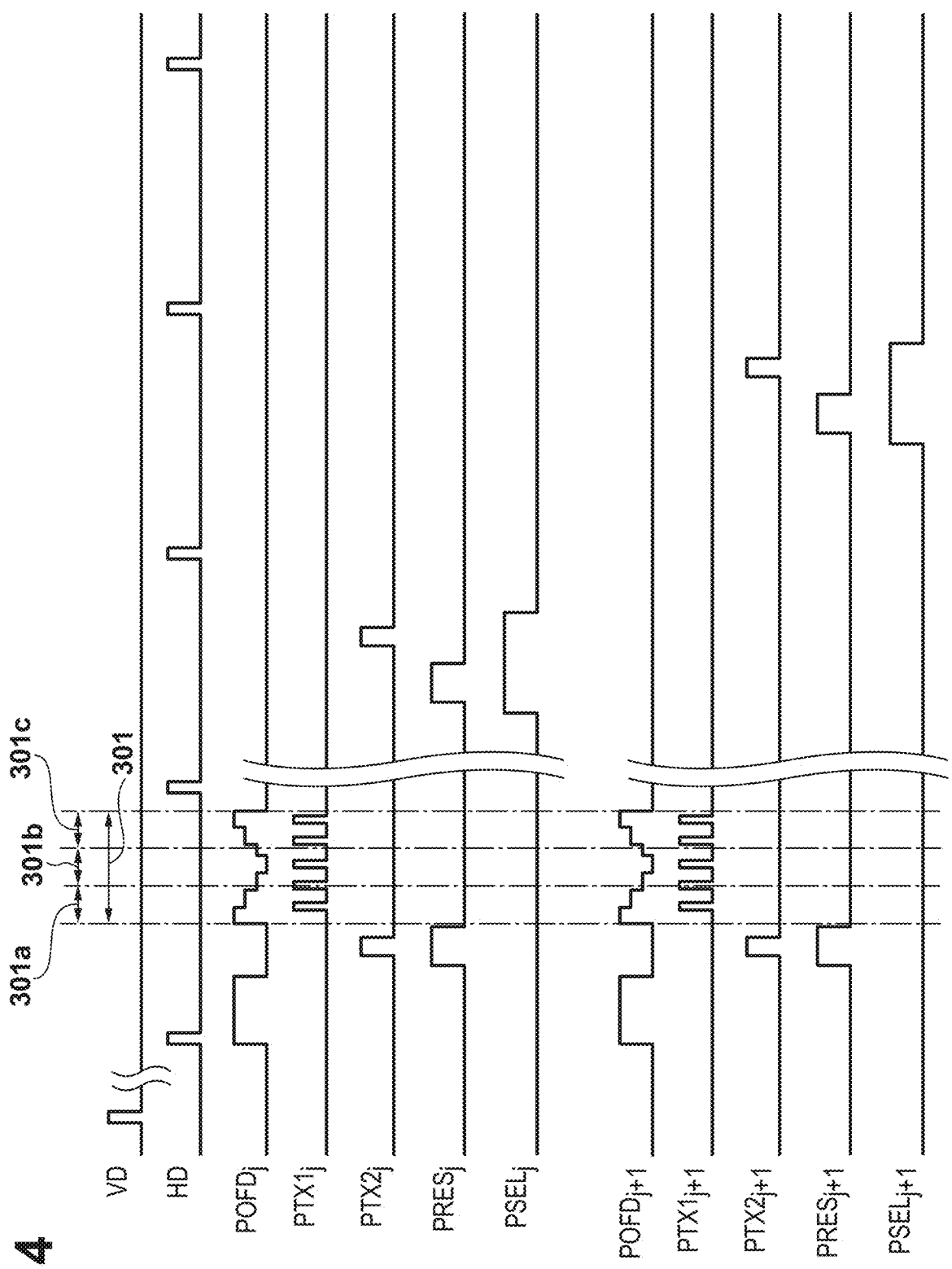
FIG. 4 is a timing chart for explaining an operation of the image capturing apparatus according to the first embodiment.

An example of the operation for implementing the above-described change in the conversion efficiency will be described with reference to FIG. 4. FIG. 4 is a timing chart for explaining the operation of the image capturing apparatus 100. This operation is executed by the vertical scanning circuit 20 changing, in accordance with a control signal from the control circuit 50, the level of each signal supplied to the pixel array 10. FIG. 4 focuses on a jth pixel row and a (j+1)th pixel row of the pixel array 10. A vertical synchronization signal VD indicates the start timing of signal readout performed to generate one frame. A horizontal synchronization signal HD indicates the start timing of the signal readout of one row. The control signals POFD, PTX1, PTX2, PRES, and PSEL are the control signals explained in FIG. 2, and the reference symbols j and j+1 have been added as a suffix to each control signal to identify the corresponding pixel row.

When the vertical synchronization signal VD changes to high level and a generation operation of a given frame is started, the control circuit 50 resets the potential of each PD 101 to Vdd by changing the control signal POFD of each signal row to high level. More specifically, the charges accumulated in each PD 101 are discharged to the OFD. The control circuit 50 subsequently sets the control signals PTX1, PTX2, and PRES at high level to reset the potential of each MEM 102 and the potential of each FD unit 103 to Vdd. More specifically, the charges remaining in each MEM 102 are removed.

Subsequently, the exposure period 301 is started. The exposure period 301 is a period from a first point after each PD 101 and each MEM 102 have been reset until a second point at which the pixel signal readout is started. During the exposure period 301, the control circuit 50 supplies a high-level pulse as the control signal PTX1 a plurality of times so that each transfer transistor 104 is turned on a plurality of times. Each time the transfer gate control signal PTX1 is switched to high level, the charges accumulated in each PD 101 are transferred to the corresponding MEM 102 via the transfer transistor 104 and are accumulated in the MEM. During the exposure period 301, the control circuit 50 also controls the voltage (that is, the gate voltage of the OFD transistor) of the control signal POFD. More specifically, the control circuit 50 changes the voltage value of the control signal POFD to high level upon the start of the exposure period 301. The control circuit 50 subsequently decreases, stepwise, the voltage value of the control signal POFD so that the voltage value will be set at low level in the middle of the middle period 301b of the exposure period 301. The control circuit 50 subsequently increases, stepwise, the voltage value of the control signal POFD so that the voltage value will return to high level in the final period 301c of the exposure period 301. In this embodiment, the control circuit 50 changes the control signal POFD and the control signal PTX1 at the same timing for all of the pixels 12 in the pixel array 10. This causes a so-called global shutter driving operation to be executed.

After the end of the exposure period 301, the control circuit 50 reads out the charges accumulated in the MEMs 102 for each pixel row. More specifically, the control circuit 50 changes the control signal PRES to high level after changing the control signal PSEL of a target pixel row to high level. Subsequently, after returning the control signal PRES to low level, the control circuit 50 maintains the selection control signal PSEL at high level and changes the control signal PTX2 to high level.

In this embodiment, as described above, the control circuit 50 turns on each OFD transistor 109 by a higher gate voltage in the initial period 301a and the final period 301c of the exposure period 301 than in the middle period 301b. As a result, in the initial period 301a and the final period 301c of the exposure period 301, the opening degree of charges of the OFD transistor becomes higher than that in the middle period 301b, and thus more charges are discharged from the PD 101 via the OFD transistor 109. As a result, fewer charges are transferred from the PD 101 to the MEM 102 via the transfer transistor 104. That is, the conversion efficiency of the incident light becomes as that of the graph shown in FIG. 3A. In this manner, in this embodiment, the OFD transistor has three or more stages of opening degrees of a highest opening degree (when the gate voltage is set at high level), a lowest opening degree (when the gate voltage is set at low level), and a middle opening degree (when the gate voltage is set between high level and low level).

Figure 5A:
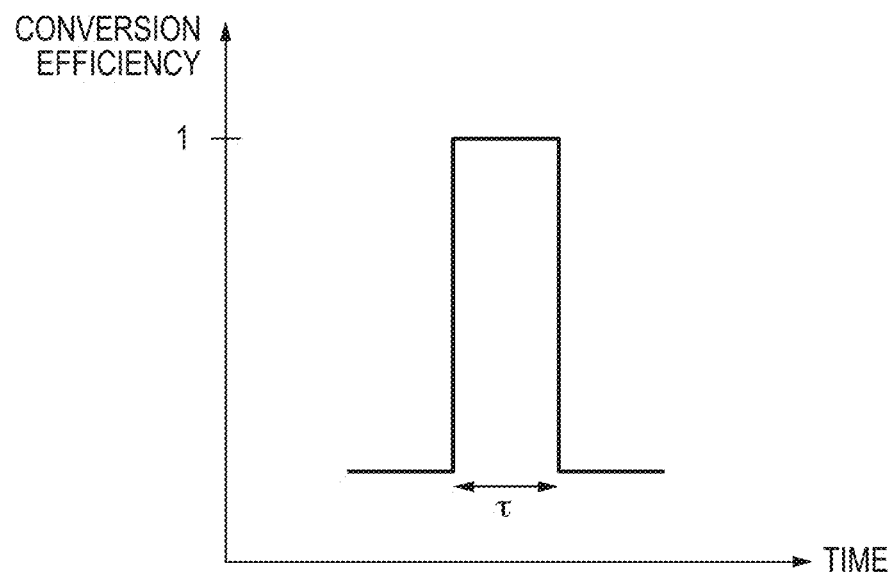
FIGS. 5A and 5B are graphs for explaining an exposure period calculation method according to the first embodiment.
Figure 5B:
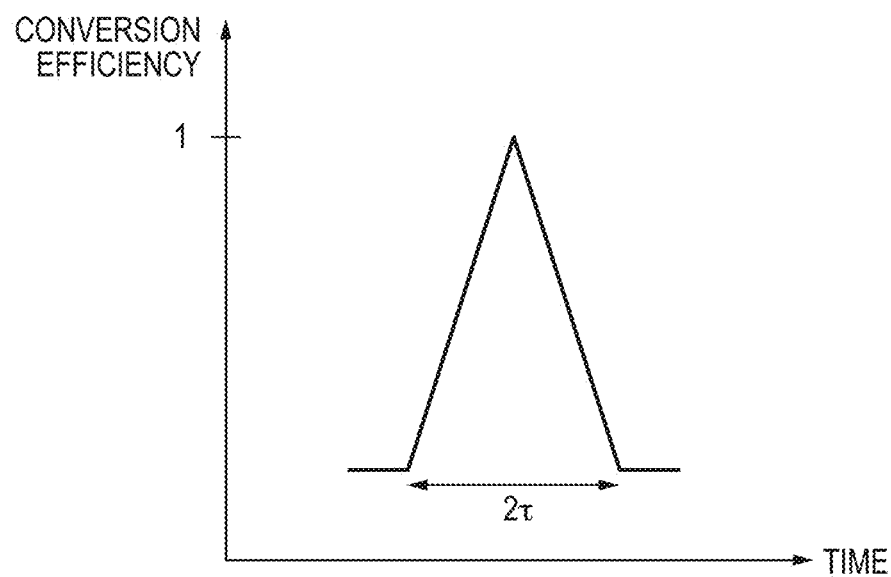

An example of a method of determining the gate voltage value of the OFD transistor 109 will be described next with reference to FIGS. 5A and 5B. In the case of automatic exposure, the shutter speed is determined by the brightness of the object and the f-number, and in the case of manual exposure, the shutter speed is uniquely determined by the set values. In a conventional driving method, the shutter speed does not change during the exposure time when a normal shutter with high shutter efficiency is used. Hence, the relationship between time and the light amount conversion efficiency has, as shown in FIG. 5A, a rectangular shape in which the length of the base is an exposure time ti, and the exposure amount is expressed by an area 1×τ. Thus, in the above-described embodiment, in order to obtain the same exposure amount, the exposure time is set so that a graph expressing the conversion efficiency, as shown in FIG. 5B, will be an isosceles triangle whose base is 2τ and height is 1. The control circuit 50 controls the gate voltage of the OFD transistor 109 so as to set the conversion efficiency in this manner.

In the above-described embodiment, the opening degree of the OFD transistor 109 may be adjusted based on the amount of incident light to each PD 101. A pixel that has received a beam of light intensely and has generated a large amount of charges will discharge more charges compared to a pixel that has not received a beam of light intensely and has generated a small number of charges, even if the opening degrees of the respective OFD transistors 109 are the same. Hence, the larger the amount of incident light to the PD 101, the control circuit 50 may decrease the opening degree of the OFD transistor 109.

The amount of incident light to each PD 101 can be determined by various kinds of methods. For example, the control circuit 50 may determine the amount of incident light by the potential of a source follower of the pixel 12. The image capturing apparatus 100 can further include an exposure sensor for AE (Automatic Exposure Control) that measures the exposure amount on the image capturing apparatus 100, and the control circuit 50 may determine the amount of incident light based on a measurement value obtained by the exposure sensor. The control circuit 50 may pre-transfer a pixel signal by turning on the transfer transistor 105 in the initial period of the exposure period 301, and determine the amount of incident light based on the obtained signal value. The control circuit 50 may determine the amount of incident light at the generation of the next frame by using the preceding frame. Each pixel 12 may further include an A/D converter that converts a pixel signal into a digital format, and the control circuit 50 may determine the amount of incident light based on this pixel signal converted into a digital format. The pixel array 10 may also include, other than the image capturing pixels 12, a pixel for determining the amount of incident light, and the control circuit 50 may determine the amount of incident light based on the output of this pixel.

If the opening degree of the OFD transistor 109 has a small number of stages, the steps of the changes in the conversion efficiency of the incident light will be conspicuous, and this may generate steps in the density in the moving direction of the object. Hence, the plurality of pixels 12 may be divided into a plurality of groups to shift the timing to change the opening degree of the OFD transistor 109. Timings shifted in this manner may be added or the timing to change the opening degree of the OFD transistor 109 may be shifted between even number rows and odd number rows of the pixel array 10 to suppress the steps when an interface is displayed. As a result, the conversion efficiencies of some pixels are changed at a first timing, and the conversion efficiencies of some other pixels are changed at a second timing different from the first timing.

Second Embodiment

An image capturing apparatus according to the second embodiment will be described. Points different from those of the first embodiment will be described hereinafter. An arrangement whose description has been omitted may have the same arrangement as that in the first embodiment.

Figure 6:
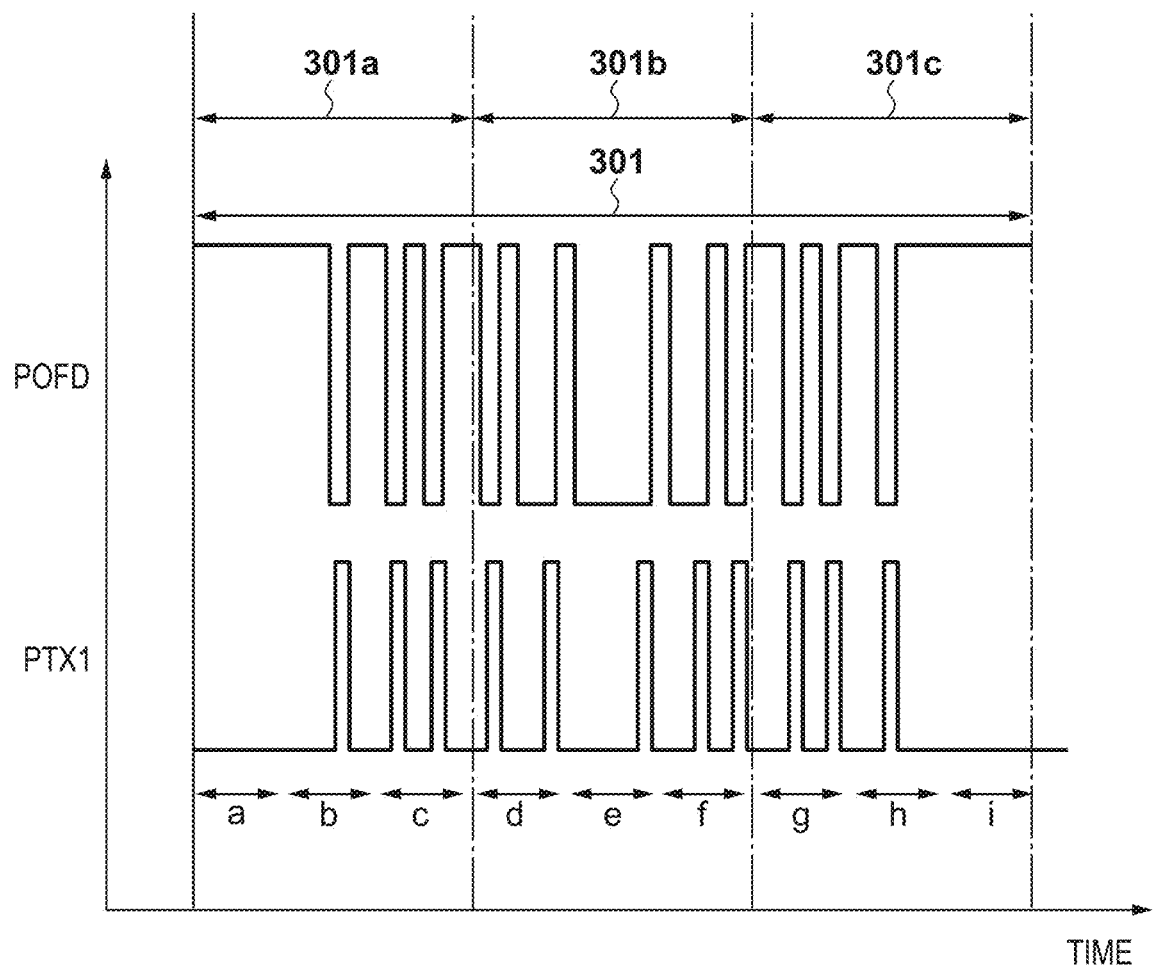
FIG. 6 is a timing chart for explaining an operation of an image capturing apparatus according to the second embodiment.
Figure 7:
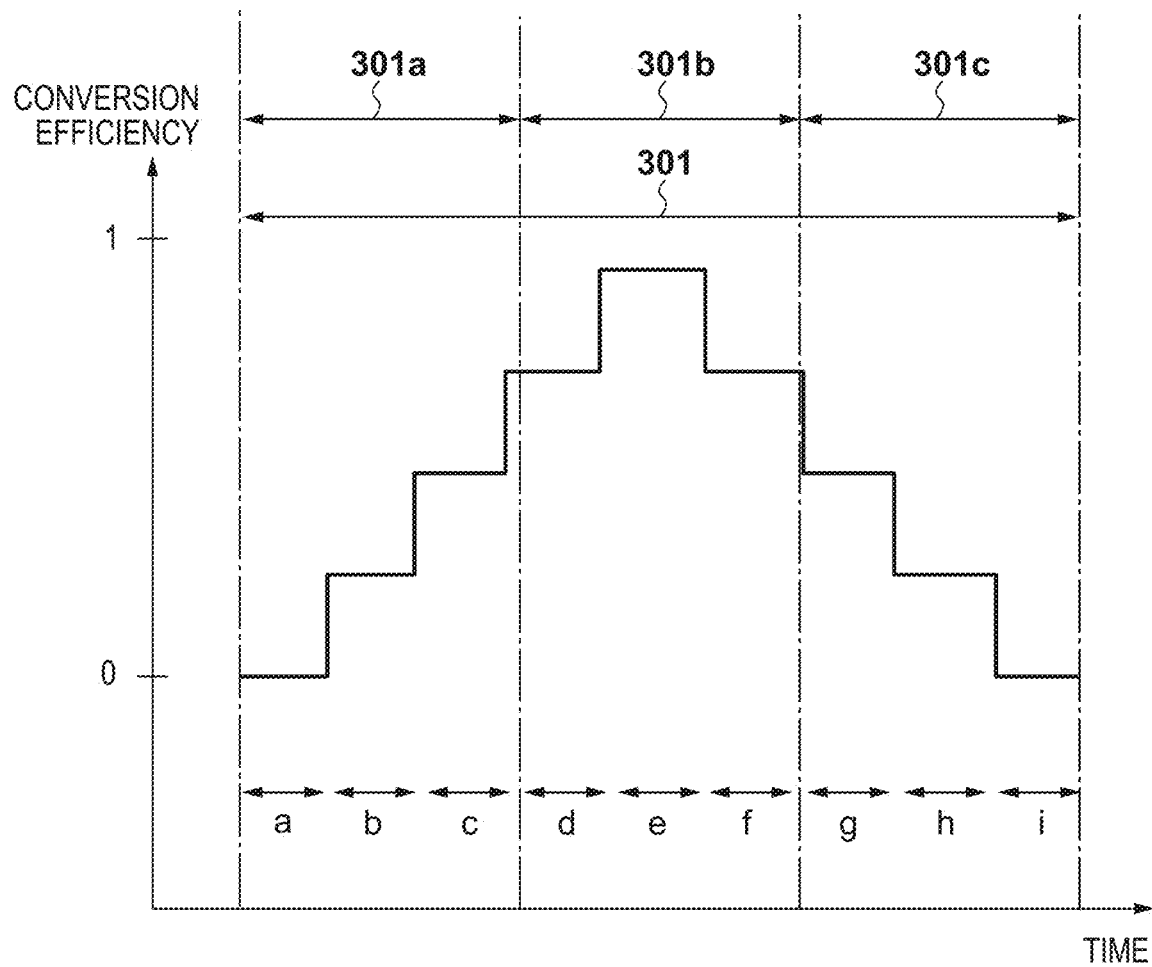
FIG. 7 is a graph for explaining a change in conversion efficiency according to the second embodiment.
Figure 8A:
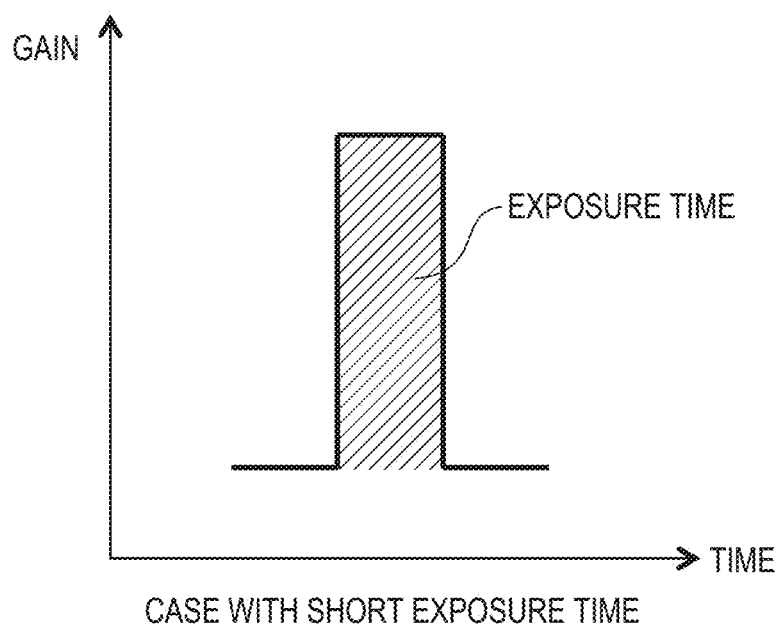
FIGS. 8A and 8B are graphs for explaining a comparison between a case with a long exposure time and a case with a short exposure time.
Figure 8B:
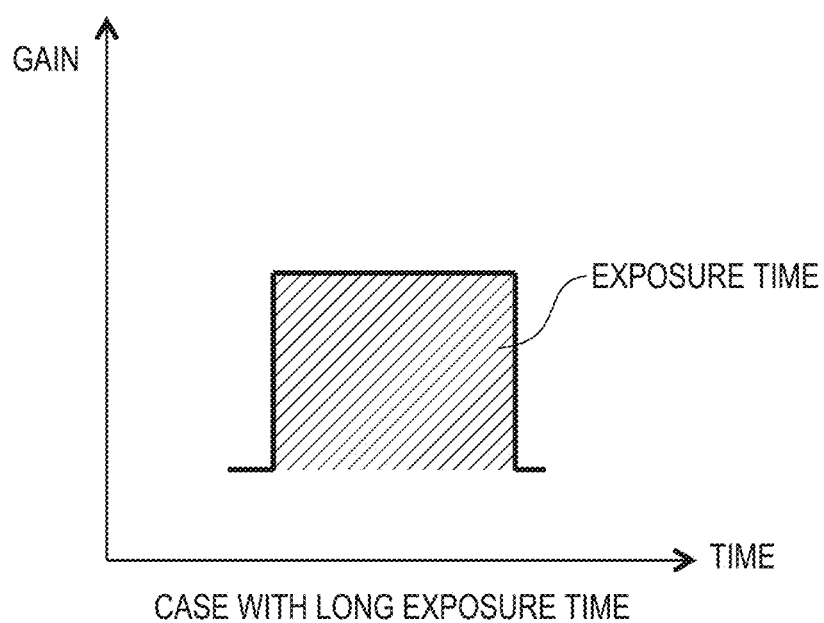
Figure 9A:
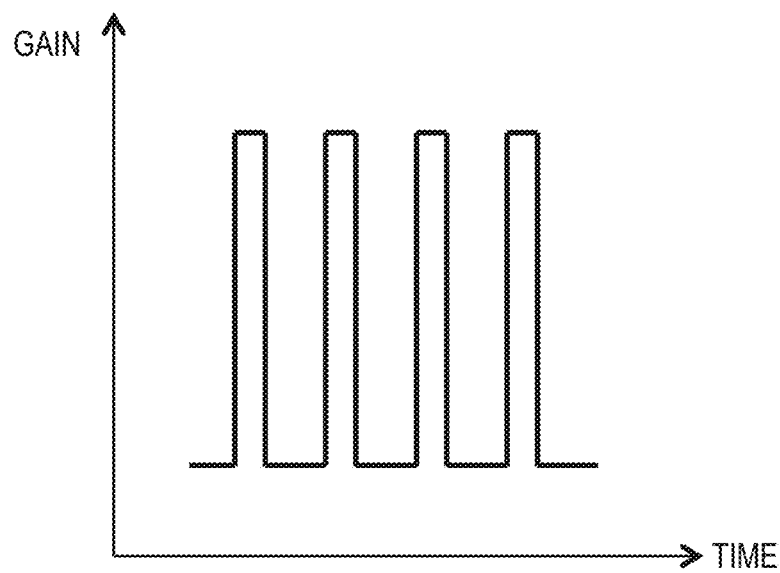
FIGS. 9A and 9B are views for explaining a blur in a frame.
Figure 9B:
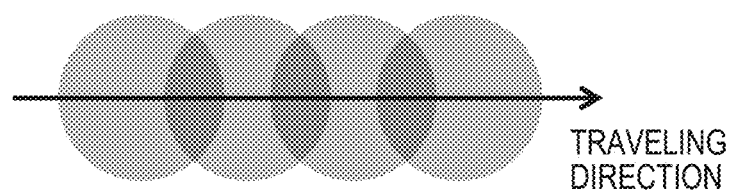

The second embodiment differs from the first embodiment in that the waveforms, shown in FIG. 6, of a control signal POFD and a control signal PTX1 in an exposure period 301 are different from those in the first embodiment. In the second embodiment, a control circuit 50 also supplies a high-level pulse as the control signal PTX1 a plurality of times so that each transfer transistor 104 is turned on a plurality of times in the exposure period 301. The control circuit 50 also supplies a high-level pulse as the control signal POFD a plurality of times in the exposure period 301. During the exposure period 301, the control circuit 50 switches the ratio of the time in which an ON voltage (high level) is applied to the gate of each OFD transistor 109. More specifically, in a middle period 301b of the exposure period 301, the ratio of the time in which the ON voltage is applied is higher than that in an initial period 301a and that in a final period 301c. More specifically, the ratio of the time in which the ON voltage is applied is 100% in a period a and a period i, 75% in a period b and a period h, 50% in a period c and a period g, 25% in a period d and a period f, and 0% in a period e. The control circuit 50 switches the control signal PTX1 to high level immediately before the OFD transistor 109 is turned on and transfers the charges accumulated in each PD 101 to a corresponding MEM 102. As a result, as shown in FIG. 7, the conversion efficiency in the middle period 301b will be higher than those in the initial period 301a and the final period 301c.

Third Embodiment

An image capturing apparatus according to the third embodiment will be described. Points different from those of the first embodiment will be described. An arrangement whose description has been omitted may have the same arrangement as that in the first embodiment. In the third embodiment, a control circuit 50 obtains a plurality of images to generate one frame and stores these images in a memory which is outside a pixel array 10. When generating a frame by adding the plurality of images, the control circuit 50 increases the weight of each image obtained in a middle period to be higher than the weights of the images obtained in an initial period and a final period. The weight can also be called a gain or a coefficient. More specifically, when adding N images, the control circuit 50 increases the weight from the first image to the (N/2)th image and decreases the weight from the (N/2)th image to the Nth image.

In this embodiment, the exposure time for generating one frame is defined by the set of the exposure times of the plurality of images. In this embodiment, the conversion efficiency (conversion efficiency of N/3 images obtained in the middle period) in the middle period of the exposure period for generating one frame is also higher than the conversion efficiency (conversion efficiencies of 2N/3 images obtained in each of the initial period and the final period) in each of the initial period and the final period. In the image capturing apparatus according to the third embodiment, a circuit (for example, an MEM 102 of FIG. 2) used to implement a global shutter may be omitted.

OTHER EMBODIMENTS

As an application of the image capturing apparatus according to each of the above-described embodiments, a camera incorporating the image capturing apparatus will be exemplified. The camera conceptually includes not only an apparatus whose principal purpose is shooting but also an apparatus (for example, a personal computer or portable terminal) additionally provided with a shooting function. The camera includes the image capturing apparatus according to the present invention exemplified as each of the above embodiments, and a signal processing unit for processing information based on a signal output from the image capturing apparatus. This signal processing unit can include a processor for processing digital data as image data. The processor can calculate a defocus amount based on signals from pixels having a focus detection function of the image capturing apparatus, and perform processing for controlling focus adjustment of an imaging lens based on the defocus amount. An A/D converter for generating the image data can be provided in the image capturing apparatus or provided separately from the image capturing apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-116090, filed Jun. 13, 2017 which is hereby incorporated by reference herein in its entirety.

What is claimed is:

1. An image capturing apparatus for capturing a moving image, the apparatus comprising:
a photoelectric conversion portion configured to generate charges in accordance with incident light in an exposure period;
a generation circuit configured to generate a pixel signal of each frame of the moving image based on charges generated in the photoelectric conversion portion; and
a control circuit configured to change, in an exposure period for generating one frame of the moving image, a conversion efficiency of converting the incident light to the photoelectric conversion portion into the pixel signal, the conversion efficiency indicating a value of the pixel signal to be generated for a unit amount of the incident light,
wherein the control circuit sets the conversion efficiency in a middle period in the exposure period for generating one frame of the moving image to be higher than the conversion efficiency in an initial period of the exposure period and the conversion efficiency in a final period of the exposure period.

2. The apparatus according to claim 1, wherein the image capturing apparatus comprises a plurality of pixels,
wherein each of the plurality of pixels comprises (1) the photoelectric conversion portion, (2) a holding circuit configured to hold the charges, (3) a transfer transistor configured to transfer the charges accumulated in the photoelectric conversion portion to the holding circuit, and (4) an overflow drain transistor configured to discharge the charges accumulated in the photoelectric conversion portion, and
wherein in the exposure period for generating one frame of the moving image, (a) the control circuit turns on the transfer transistor a plurality of times, and (b) the control circuit changes the conversion efficiency by controlling a gate voltage of the overflow drain transistor.

3. The apparatus according to claim 2, wherein in the exposure period for generating one frame of the moving image, the control circuit controls the gate voltage so that the overflow drain transistor has an opening degree of not less than three stages.

4. The apparatus according to claim 3, wherein the control circuit adjusts the opening degree based on an amount of incident light to the photoelectric conversion portion.

5. The apparatus according to claim 4, wherein the image capturing apparatus further comprises an exposure sensor configured to measure an exposure amount on the image capturing apparatus, and
wherein the control circuit determines the amount of incident light to the photoelectric conversion portion based on a measurement value obtained by the exposure sensor.

6. The apparatus according to claim 4, wherein each of the plurality of pixels further comprises an A/D converter configured to convert the pixel signal into a digital format, and
wherein the control circuit determines the amount of incident light to the photoelectric conversion portion based on the pixel signal converted into the digital format by the A/D converter.

7. The apparatus according to claim 2, wherein in the exposure period for generating one frame of the moving image, the control circuit controls the gate voltage so as to switch a ratio of time in which an ON voltage is applied to a gate of the overflow drain transistor.

8. The apparatus according to claim 2, wherein the plurality of pixels comprises (a) a first pixel in which the conversion efficiency changes at a first timing and (b) a second pixel in which the conversion efficiency changes at a second timing different from the first timing.

9. The apparatus according to claim 1, wherein the control circuit obtains a plurality of images for generating one frame of the moving image and changes the conversion efficiency by switching a weight used when adding the plurality of images.

10. A camera comprising:
an image capturing apparatus defined in claim 1; and
a signal processing circuit configured to process a signal output from the image capturing apparatus.

11. A method of controlling an image capturing apparatus for capturing a moving image, the method comprising:
generating a pixel signal of each frame of the moving image based on charges generated in a photoelectric conversion portion configured to generate charges in accordance with incident light in an exposure period; and
changing, in an exposure period for generating one frame of the moving image, a conversion efficiency of converting the incident light to the photoelectric conversion portion into the pixel signal, the conversion efficiency indicating a value of the pixel signal to be generated for a unit amount of the incident light,
wherein the conversion efficiency in a middle period in the exposure period for generating one frame of the moving image is set to be higher than the conversion efficiency in an initial period of the exposure period and the conversion efficiency in a final period of the exposure period.

* * * * *